United States Patent

[11] 3,609,727

[72] Inventor Richard E. Riebs
    Hales Corners, Wis.
[21] Appl. No. 807,898
[22] Filed Mar. 17, 1969
[45] Patented Sept. 28, 1971
[73] Assignee McGraw-Edison Company
    Elgin, Ill.

[54] REMOTE METER READING SYSTEM
    22 Claims, 9 Drawing Figs.
[52] U.S. Cl. .................................................. 340/204,
    340/201, 340/310, 340/206
[51] Int. Cl. .................................................. G08c19/36,
    G08c 19/28, G08c 19/26
[50] Field of Search ........................................... 340/204,
    190, 201.1

[56] References Cited
    UNITED STATES PATENTS
    3,381,288  4/1968  Vlodrop ..................... 340/204
    3,491,244  1/1970  Stewart ...................... 340/190

Primary Examiner—Thomas B. Habecker
Attorney—Richard C. Ruppin

ABSTRACT: A position encoder and transmitter for an automatic remote meter reading system having a first oscillator producing a relatively high frequency pulse rate and a second oscillator producing a lower frequency pulse rate for disabling the first oscillator and which is determined by the value of the circuit parameters of the second oscillator. An encoder means varies the value of the circuit parameters in accordance with the position of the meter being read so that the rate of the low frequency pulse rate and the number of interruptions of the high frequency pulse rate during a predetermined interval of time indicates the position of the meter.

PATENTED SEP 28 1971
3,609,727
SHEET 2 OF 2
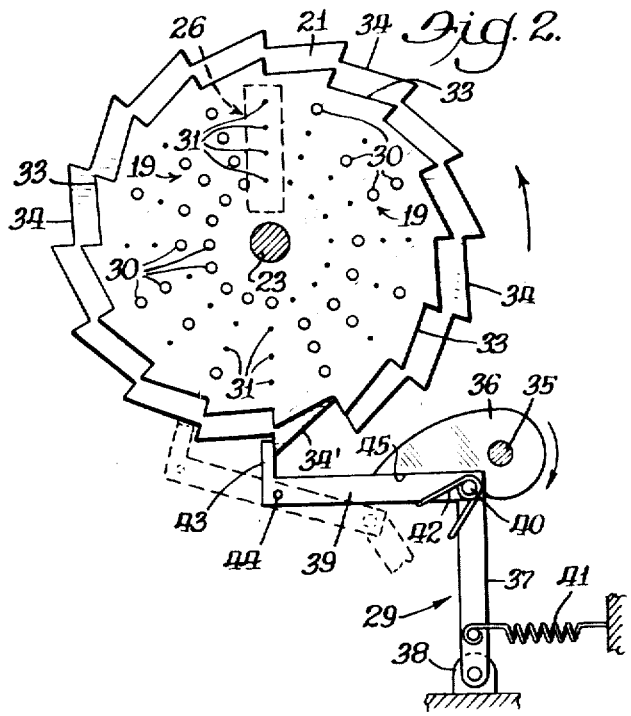
Fig. 2.
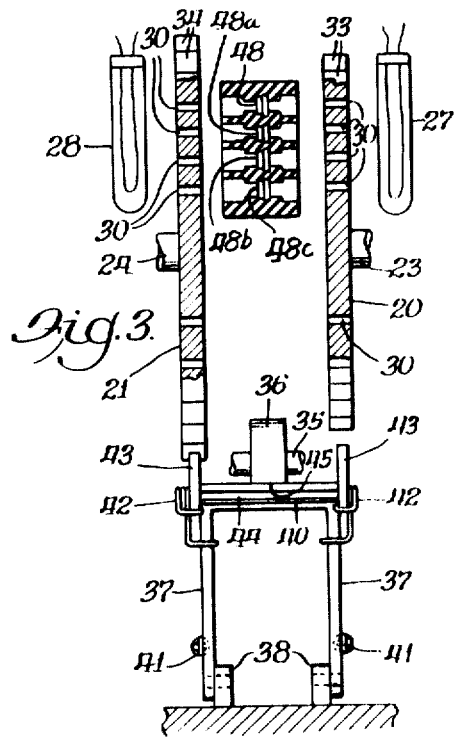
Fig. 3.
GATE INTERVAL
Fig. 5.
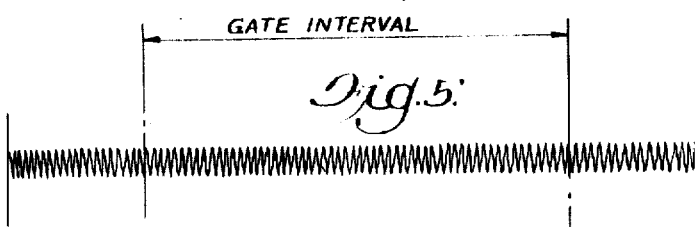
Fig. 6.
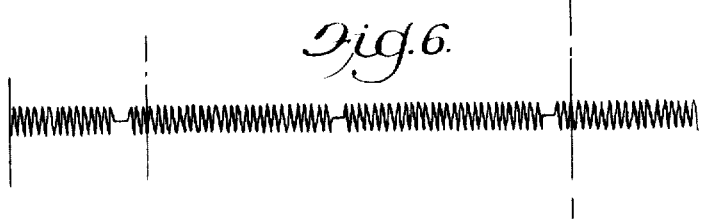
Fig. 7.
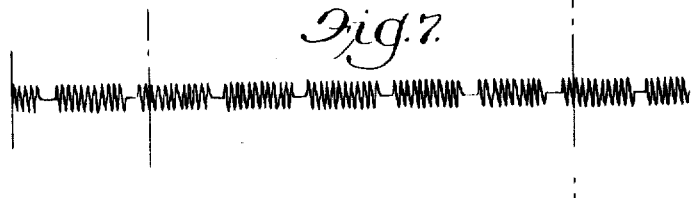
Fig. 8.
Fig. 9.
Fig. 4.
| POS. | BINARY CODE | | | |
|---|---|---|---|---|
| 1 | • | • | • | • |
| 2 | O | • | • | • |
| 3 | • | O | • | • |
| 4 | O | O | • | • |
| 5 | • | • | O | • |
| 6 | • | • | O | O |
| 7 | • | O | O | • |
| 8 | • | O | O | O |
| 9 | O | • | • | O |
| 10 | O | • | • | O |
| 11 | O | • | O | • |
| 12 | O | • | O | O |
| 13 | O | O | • | • |
| 14 | O | O | • | O |
| 15 | O | O | O | • |
| 16 | O | O | O | O |
Inventor:
Richard E. Riebs
By Richard C. Ruppin
Atty.

REMOTE METER READING SYSTEM

BACKGROUND OF THE DISCLOSURE

This invention relates to a transmitter and in particular to a device for producing a variable digital output quantity for transmission to a remote location which is representative of the position of the shaft or other movable member. The invention has particular, but not exclusive, applications to systems for the automatic remote reading of utility meters from a central station and numerically controlled machinery.

Utility meters, such as electric, gas and water meters, are generally widely distributed at the customer's points of usage. It is the present practice in the reading of such meters for a meter reader to visit each customer's site and to observe and record the registration on each unit. While there has been a large number of proposals for the automatic reading of such meters from a remote location, they have not been commercially adapted because of their high cost and because they could not meet the limitations imposed by existing utility meters and communications systems. Such limitations include expense and the relatively confined space available for encoding devices and utility metering equipment presently installed.

It is an object of the invention to provide an economical encoding and signal transmitting assembly.

Another object of the invention is to provide an encoding and signal transmitting assembly which may be incorporated into the relatively confined space such as may exist in a utility meter.

Another object of the invention is to provide a signal transmitter wherein the number of interruptions during a predetermined time interval of an output quantity having a constant value is used to indicate the value of an input quantity to the transmitter.

A further object of the invention is to provide a signal transmitter wherein the number of interruptions during a predetermined time interval of a carrier frequency is used to indicate the value of an input quantity to the transmitter.

These and other objects and advantages of the instant invention will be apparent from the description of the preferred embodiment hereinbelow.

SUMMARY OF THE INVENTION

The invention includes a first means for producing an output quantity having a fixed value and a second means operative to modify or vary the first means so that the output quantity of the first means is modified and the number of modifications during a predetermined interval of time may be used to indicate the value of a quantity affecting the input to the second means. The latter quantity is typically a digital value representing a position of a shaft or other movable member. The number of modifications or variations in the output quantity of the first means is thus representative of the position of the shaft or movable member.

BRIEF DESCRIPTION OF THE DRAWINGS

FIGS. 2 and 3 illustrate a coded disc and information bit configuration usable with the instant invention;

FIG. 4 is a table illustrating an example of the code transmitted by the encoder and transmitter illustrated in FIGS. 1–3.

FIGS. 5–9 illustrate different transmitted carrier frequencies for different conditions of the transmitter.

DESCRIPTION OF THE PREFERRED EMBODIMENT

Figure 1:
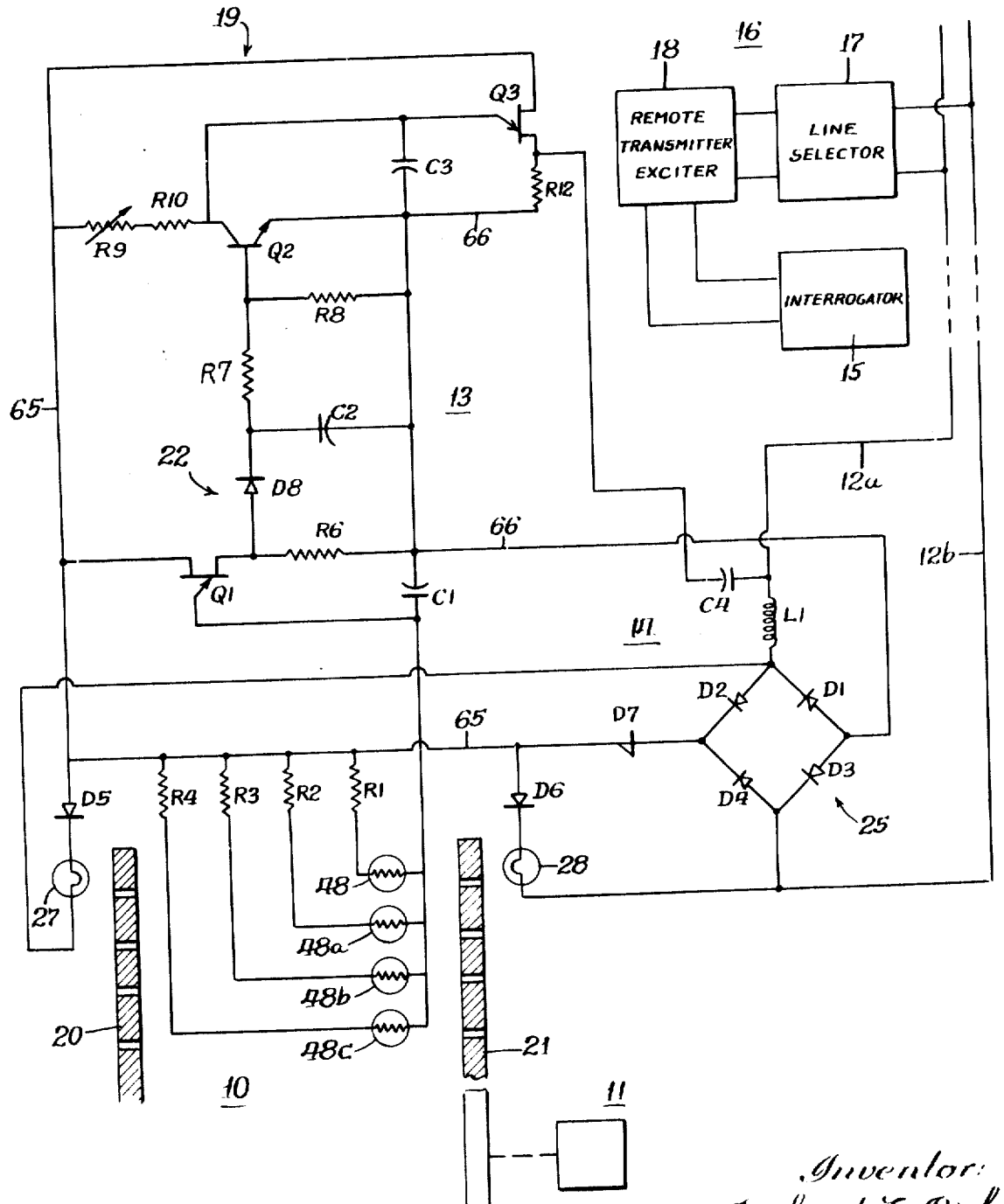
FIG. 1 shows a remote meter reading system incorporating the encoder and signal transmitter according to the instant invention.

FIG. 1 shows an automatic remote meter reading system in which an encoder 10 and a transmitter 13, according to the instant invention, are employed. The encoder 10 is mechanically coupled to the meter 11 which is to be read and to the customers'telephone lines 12a and 12b through the transmitter 13 and a line coupler 14. An interrogator 15 at the telephone exchange 16 is coupled to the lines 12a and 12b through a line selector 17 and a remote transmitter exciter 18.

The details of the meter 11, the interrogator 15, the line selector 17 and the remote transmitter exciter 18 form no part of the instant invention and, accordingly, will not be discussed in detail. It is sufficient for purposes of understanding the instant invention to note that, when it is desired to read the meter 11, the interrogator 15 is actuated and in turn actuates the line selector 17 and the remote transmitter exciter 18. The remote transmitter exciter 18 then sends an interrogation command through the lines 12a and 12b which actuates the line coupler 14, whereby the encoder 10 and the transmitter 13 are actuated and coupled to the lines 12a and 12b. The encoder 10 provides the coded information relative to the registration of meter 11 to the transmitter 13 which, in turn, transmits the information to the interrogator 15.

FIGS. 2 and 3 show the preferred embodiment of the encoding device 10 in greater detail to include a pair of coded discs 20 and 21 which are respectively mounted for rotation about central shafts 23 and 24, a sensor assembly 26, a pair of lamps 27 and 28 and a drive assembly 29 for coupling discs 20 and 21 to the meter being read.

The discs 20 and 21 are provided with an array of coding units, four coding units being provided for each disc position. In the illustrated embodiment, wherein each of the discs 20 and 21 have 16 positions running from 0 to 15, 64 coding units are provided on each disc. Also, where the sensor assembly 26 is photosensitive, the coding units comprise holes or transparent positions 30 and unperforated opaque positions 31.

As seen in FIG. 2, the coding units 30 and 31 are arranged on the disc 20 in groups each extending in a radial direction. The coding units are substantially equally spaced in the radial direction and groups of coding units are equally spaced in the circumferential direction. A similar array of units 30 and 31 are arranged on the disc 21. As will be pointed out hereinbelow, the arrangement of holes 30 and opaque positions 31 are such that, when used with at least a four unit sensor assembly 26, an unambiguous code will be provided for each of the 16 positions of the discs 20 and 21.

In addition, the outer periphery of each of the discs 20 and 21 is coupled to a drive assembly 29 which is operative to successively step the disc 20 through each of its 16 positions and then to advance the disc 21 one position for each revolution of the disc 20. The details of the drive assembly 29 form no part of the instant invention and, accordingly, will not be discussed in detail. One example of a drive mechanism capable of performing these functions is described in copending application Ser. No. 691,020, filed Dec. 15, 1967, and assigned to the assignee of the instant invention. It is sufficient for purposes of understanding the instant invention to note that the drive assembly 29 is coupled to the meter 11 and that it will step the disc 20 one position for each of a predetermined number of revolutions of the meter assembly 11.

As seen in FIGS. 2 and 3, the sensor assembly 26 comprises an opaque head 46 which is disposed between the discs 20 and 21 and in close parallelism thereto. When 16-position discs are provided, the sensor assembly 26 includes at least four sensor units or information bit means 48, 48a, 48b and 48c, which are spaced along the head 46 at the same radial distance as that between the coding units 30 and 31. The details of the sensor units 48–48c also form no part of the instant invention, and, accordingly, will not be discussed in detail. It is sufficient for purposes of understanding the instant invention to note that each may comprise a photoresistive element which normally has a relatively high impedance and which changes to a low impedance state upon being illuminated. For a more complete description of sensor units 48–48c which may be employed with the instant invention, reference is again made to copending application Ser. No. 691,020, filed Dec. 15, 1967, and assigned to the assignee of the instant invention.

The sensor units 48–48c are arranged so that for each position of the discs 20 and 21 one of the sensor units will face four of the coding units 30 or 31 in each of the discs 20 and 21. The lamps 27 and 28 are disposed adjacent the outer surfaces of each of the discs 20 and 21 are in an opposed relation to the sensor assembly 26. As will be pointed out more fully hereinbelow, the lamps 27 and 28 are connected to be sequentially energized so that the sensor units 48–48c will be selectively energized through the holes 30 in the disc 20 by light emitted from the lamp 27 and then from the opposite sides through holes 30 in disc 21 by light emitted from the lamp 28. The position code for the disc 20 will be determined by which ones of the sensor units 48–48c are energized when the lamp 27 is lit, and similarly, the position code for the disc 21 will be determined by which ones of the sensor units 48–48c are illuminated when the lamp 28 is lit. It will be understood that only those sensor units 48–48c which are opposite a hole 30 in the appropriate one of the discs 20 or 21 will be illuminated, while those adjacent an opaque position 31 will remain unenergized.

The drive assembly 29 includes a scroll cam member 36 which is fixed to a shaft 35 coupled to the meter being read. The cam 36 cooperatively engages a pawl assembly for stepping the discs 20 and 21 and which comprises a first pair of parallel links 37 having one end pinned at fixed pivot point 38 and a second pair of links 39 pivotally coupled to the other end of links 37 by knee pin 40. Spring 41 holds pin 40 in resilient engagement with the cam 36, and springs 42 urge clockwise rotation of links 39 to urge fingers 43 carried by their free ends into engagement with the teeth 33 and 34 on discs 20 and 21.

The diameter of the disc 21 is sufficiently greater than that of the disc 20 so that the radially outward extremity of disc 20 does not extend to the innermost portion of the teeth 34. As a result, one of the fingers 43 will engage the teeth 34 on disc 21, but the other finger 43 will normally be held out of engagement with the teeth 33 of disc 20 by a pin 44 which couples the ends of links 39. However, one of the teeth 34 on the disc 21, and designated 34', is deeper than the remaining teeth so that the teeth 33 on disc 20 will extend past its inner extremity.

As those skilled in the art will appreciate, the cam member 36 may be coupled to the meter by a gear drive (not shown) in such a manner that the cam member 36 will make one revolution for each of a predetermined number of revolutions in the meter assembly (not shown). As the cam member 36 rotates clockwise, as seen in FIG. 2, the links 37 and 39 are moved from their full to their phantom position wherein the finger 43 will move into engagement with the succeeding ones of the teeth 34 on disc 21. As the cam member 36 completes one revolution, wherein its flat portion 45 is moved into engagement with the pin 40, the spring 41 will return links 37 and 39 to their full positions, thereby moving the disc 21 one position in the counterclockwise direction. The disc 20 will remain stationary however, because the other finger 43 will be held out of engagement with its teeth 33 by the larger outer periphery of the disc 21 and the pin 44.

After the disc 21 has completed one revolution wherein the tooth 34' is in a position to be engaged by the one finger 43, the greater depth of tooth 34' will allow engagement between the other finger 43 and one of the teeth 33 of the disc 20. In this manner, the disc 20 will be moved one position for each complete revolution of the disc 21.

If the position of the discs 20 and 21 shown in FIGS. 2 and 3 is taken as the first position, none of the photosensitive units 48–48c will be illuminated when the lamps 27 and 28 are lit. When the discs 20 and 21 are stepped to their next counterclockwise position from the position illustrated in FIG. 2, the photosensitive unit 48 will be illuminated through a hole 30 in one of the rows of holes 30 and/or opaque positions 31 in the discs 20 and 21. It may thus be seen that, as the discs 20 and 21 are stepped through each of their 16 positions, a different arrangement of photosensitive units 48–48c will be illuminated to provide the 16-position unambiguous code shown in FIG. 5. A table illustrating the 16 different codes is shown in FIG. 4.

Reference is again made to FIG. 1 which illustrates how the sensor units 48–48c are coupled to the transmitter 13. More specifically, the sensor units 48, 48a, 48b and 48c are respectively connected in series with resistors R1, R2, R3 and R4, and the series combinations are connected in parallel with each other and in series with a capacitor C1. As will be explained in greater detail hereinbelow, the resistors R1, R2, R3 and R4 and the capacitor C1 comprise a portion of an oscillating circuit and the sensor units 48–48c function to switch one of the resistors R1, R2, R3 and R4 into or out of the oscillator circuit in accord with the position of the discs 20 and 21.

The transmitter 13 includes a carrier oscillator circuit 19, a coder oscillator circuit 22, a coupling circuit 14 and a diode bridge 25. The diode bridge 25 consists of diodes D1, D2, D3 and D4 which are connected across the telephone lines 12a and 12b and also across the coupling circuit 14, the encoder 10, and the oscillator circuits 19 and 22. The coupling circuit 14 includes capacitor C4, inductor L1 and a conventional Shockley diode D7. The diode D7 has a breakdown voltage in excess of normal telephone line operating voltages and serves to isolate the encoder 10 and transmitter 13 from the telephone circuit when the latter circuit is in use for telephone calls. As will be further discussed hereinafter, when it is desired to read the meter 11 an interrogation command which may comprise a positive DC potential is placed on one of the telephone lines 12a or 12b. This potential is of a magnitude sufficient to break down the diode D7 so that it conducts and the positive DC potential is applied to conductor 65 through either diode D2 or D4 depending on which telephone line is carrying the positive DC potential. When telephone lines 12a carries the positive DC potential, the conductor 65 will be energized through diode D2 and a circuit will be completed through diode D6 and line 12b to energized lamp 28. In turn, lamp 28 will illuminate the sensor units 48–48c in accord with the position of the coder disc 21. When the positive DC potential is carried by line 12b, the conductor 65 will be energized through diode D4 and a circuit will be completed through diode D5 and line 12a to energize lamp 27. When lamp 27 is energized, the sensor units 48–48c are illuminated in accord with the position of coder disc 20. The diodes D5 and D6 serve to prevent lamps 27 and 28 from appearing as a load on the telephone lines 12a and 12b during normal telephone service when diode D7 is not broken down.

The coder oscillator circuit 22 may be a relaxation type oscillator and includes a unijunction transistor Q1 and a resistor R6 connected between base-two of transistor Q1 and conductor 66. The resistors R1, R2, R3 and R4 also comprise part of the coder oscillator circuit 22 and are respectively connected in series with sensor units 48, 48a, 48b and 48c. Each of the series combinations of the resistors and a sensor unit is connected between the conductor 65 and the emitter of transistor Q1 with the parallel combination of resistors R1–R4 and sensor units 48–48c being connected in series with capacitor C1 across conductors 65 and 66. When any one of the sensor units or photocells 48, 48a, 48b and 48c is not illuminated, it is in a high impedance condition which open circuits its serially connected resistor and inhibits accumulation of charge on capacitor C1. When all of the photocells 48–48c are in their high impedance condition, charge is completely prevented from accumulating on capacitor C1. When any one of the photocells 48, 48a, 48b and 48c is illuminated, it is in a low impedance condition permitting coupling of its associated resistor to the emitter of transistor Q1 and across conductors 65 and 66 with capacitor C1. The capacitor C1 then charges to the potential required to trigger transistor Q1 so that transistor Q1 conducts. When transistor Q1 conducts, the potential at C1 and at the emitter of Q1 drops because the values of the resistors R1–R4 are selected such that they will not pass sufficient current to maintain conduction of transistor Q1 indefinitely after it initially conducts. However, the particular resistor or parallel combination of resistors R1–R4 which are effectively placed in series with capacitor C1 do determine the length of time transistor Q1 conducts since a lower value resistor or a parallel connection of resistors allows greater current to flow to capacitor C1. Thus, the values and parallel combinations of resistors R1–R4 determine the frequency or number of times transistor Q1 conducts or pulses during an interval of time. For example, the value of R1 is selected so that it, together with C1, will cause transistor Q1 to produce a low frequency having a repetition rate of 1 pulse per gate interval. The gate interval is selected as a fixed time interval during which to count output pulses from the transmitter 13 and is illustrated in FIGS. 5–9. The resistor R2 may have a resistance equal to one-half that of R1. Therefore, if R2 alone is connected by its sensor unit 48a, it will cause the oscillator circuit 22 to produce a frequency having a repetition rate of 2 pulses per gate interval. If both R1 and R2 are connected in parallel by sensor units 48 and 48a, the oscillator circuit 22 will oscillate at a rate of 3 pulses per gate interval. Resistor R3 has a value equal to one-fourth that of resistor R1. Therefore, if resistor R3 is connected alone to capacitors C1, the coder oscillator circuit 22 will have an output repetition rate of 4 pulses per gate interval. The resistor R4 has a value one-eighth that of resistor R1 and will produce an output rate of 8 pulses per gate interval when sensor unit 48c is illuminated alone. It can thus be seen that the illumination of a different combination of sensor units 48–48c at each of the 16 positions of the coder discs 20 and 21 causes the coder oscillator circuit to produce an output frequency having a repetition rate of from 0 to 15 pulses per gate interval.

The carrier oscillator circuit 19 comprises a relaxation type oscillator, however, it should be understood that other types of oscillators such as an audiofrequency oscillator may be used. As may be seen in FIG. 1, the carrier oscillator circuit 19 includes a unijunction transistor Q3 and resistor R12 connected between base-two of transistor Q3 and conductor 66. The series combination of resistor R9, resistor R10 and capacitor C3 is also part of the carrier oscillator circuit 19. When the transmitter exciter 18 applies the positive DC potential to either of the telephone lines 12a and 12b to break down the diode D7, the resistance-capacitance circuit comprising resistor R9, resistor R10 and capacitor C3 will bias transistor Q3 so that it conducts. When the potential on capacitor C3 drops below that required to forward bias transistor Q3, transistor Q3 will cease conducting. The transistor Q3 thus functions to produce a carrier frequency having a pulse repetition rate determined by the values of resistor R9, resistor R10 and capacitor C3. These values are picked so that the carrier frequency will be sufficiently high to distinguish it from the frequency of the circuit 22 and to accommodate operating requirements of the telephone lines. In order to enable identification of the meter location from which information is being transmitted, a different carrier frequency at each meter location is utilized. This frequency may be set by the variable resistor R9. The carrier frequency output of carrier oscillator circuit 19 is taken across resistor R12 at base-two of transistor Q3 and applied to line 12a through capacitor C4. The capacitor C4 serves to prevent application of the positive DC potential on line 12a to the output of the transmitter 12. The inductor L1 isolates the output carrier frequency of the oscillator circuit 22 from the rest of the transmitter 13 and the encoder 10.

A shunt circuit which includes transistor Q2 is connected in series with resistors R9 and R10 and across the emitter-base-two circuit of transistor Q3. A resistor R8 provides a current leakage path for the emitter-base circuit of transistor Q2. The transistor Q2 is normally nonconductive and allows the transistor Q3 to conduct at the carrier frequency. The transistor Q2 is biased into conduction in response to an output spike from the transistor Q1. When transistor Q2 conducts, the emitter-base-two circuit of transistor Q3 is shunted so that the carrier oscillator circuit 19 is disabled and its carrier frequency interrupted. The output spike from the transistor Q1 appears across resistor R6 and is of a relatively short duration. It is preferred that the carrier oscillator circuit 19 be disabled for a longer period of time than would be the case if the spike output from transistor Q1 were applied directly to the base of the transistor Q2. To satisfy this requirement, a pulse stretcher circuit is provided. The pulse stretcher circuit comprises diode D8, capacitor C2 and resistor R7. The output pulse spike from transistor Q1 charges the capacitor C2. The value of resistor R7 is selected so that after capacitor C2 is charged by the spike pulse, the duration of the discharge of capacitor C2 will be sufficient to disable the carrier oscillator circuit 19 for the time it is desired to interrupt the carrier frequency.

The signal applied to the telephone line 12a is therefor a relatively high carrier frequency interrupted at a rate corresponding to the frequency or repetition rate of the coder oscillator circuit 22. The appearance of the carrier signal from the transmitter 13 on the telephone line 12a for several conditions of the coder oscillator circuit 22 is shown in FIGS. 5–9. Considering only the coder disc 21, when the disc 21 is in its first position with only opaque positions 31 between sensor units 48–48c and resistors R1–R4, none of the sensor units 48–48c will be illuminated, the coder oscillator circuit 22 will not produce an output frequency and the carrier oscillator circuit 19 will not be disabled to interrupt its carrier frequency. The carrier frequency for this condition is shown in FIG. 5. When the coder disc 21 is in its third position, only resistor R2 will be connected in series with capacitor C1 and the coder oscillator circuit 22 will produce 2 pulses per gate interval. In turn, the carrier oscillator circuit 19 will be disabled two times during each gate interval to produce the interrupted carrier frequency shown in FIG. 6. FIGS. 7, 8 and 9 respectively show the interrupted carrier frequency produced when the coder disc 21 is in its fifth, ninth and 15 positions.

It can thus readily be seen that the position of the coder disc 21 can be determined from the number of interruptions of the carrier signal on the telephone line 12a during a predetermined gate interval. The interrogator 15 may include conventional equipment for establishing the gating interval, counting the number of interruptions of the carrier frequency and identifying the meter location from which the carrier frequency is received.

While in the preferred embodiment of the instant invention, switching of the resistors R1, R2, R3 and R4 is performed by the photocells 48–48c, it will be appreciated that this switching function could be performed by other devices as well.

Accordingly, while only a single embodiment of the invention has been shown and described, it is not intended to be limited thereby, but only by the scope of the appended claims.

I claim:

1. In a position encoder and transmitter including first and second relatively movable means respectively having a code means including an array of code elements and a code means including a plurality of formation bit means, the combination comprising first circuit means operable to produce an output quantity and second circuit means associated with the information bit means and the first circuit means, said second circuit means being operative to vary the condition of the first circuit means a different predetermined number of times for each relative position of the code elements and information bit means during a constant interval of time for each of said relative positions whereby the number of times the condition of the first circuit means is varied causes a corresponding variation in said output quantity during said interval of time which represents information from each of the information bit means.

2. The combination according to claim 1 wherein said first circuit means produces a constant frequency output quantity.

3. The combination according to claim 2 wherein said second circuit means includes a circuit operative to produce a low frequency having a pulse repetition rate lower than that of said constant frequency, said second circuit means varying the condition of said first circuit means each time a low frequency pulse is produced.

4. The combination according to claim 3 wherein the pulse repetition rate of said low frequency is variable and is determined by the relative positions of the code elements and information bit means so that the constant frequency output is varied a different number of times for each relative position of the code elements and information bit means.

5. The combination according to claim 3 wherein said second circuit means includes shunt circuit means responsive to a pulse from said circuit for varying the condition of said first circuit means.

6. The combination according to claim 2 wherein each of said information bit means has one condition permitting operation of the second circuit means and another condition inhibiting operation of the second circuit means.

7. The combination according to claim 6 wherein the number of times per interval of time the second circuit means disables the first circuit means increases with an increased number of said information bit means in said one condition.

8. The combination according to claim 1 wherein each of said plurality of information bit means has a conductive and a nonconductive condition respectively determined by the relative positions of the code elements and the information bit means, each information bit means inhibiting the operation of the second circuit means when in one of said conditions.

9. The combination according to claim 1 wherein said second circuit means is operative to disable the first circuit means a different predetermined number of times for each relative position of the code elements and information bit means during a constant interval of time for each of said relative positions so that said output quantity is interrupted during said interval of time.

10. The combination according to claim 9 wherein said first circuit means produces a constant frequency output quantity.

11. The combination according to claim 10 wherein said second circuit means includes a circuit operative to produce a low frequency having a pulse repetition rate lower than that of said constant frequency, said second circuit means varying the condition of said first circuit means each time a low frequency pulse is produced.

12. The combination according to claim 11 wherein the pulse repetition rate of said low frequency is variable and is determined by the relative positions of the code elements and information bit means so that the constant frequency output is varied a different number of times for reach relative position of the code elements and information bit means.

13. The combination according to claim 12 wherein said second circuit means includes shunt circuit means responsive to a pulse from said circuit for varying the condition of said first circuit means.

14. In a system for the encoding and transmittal of information from one location to another including a position encoder and transmitter having first and second relatively movable means each having a plurality of code means, the combination comprising first generating means operative to produce a high frequency signal and second generating means coupled to the first generating means and said other code means and being operative to produce and apply a low frequency to said first generating means, the repetition rate of said low frequency being determined by the relative positions of each of said plurality of code means, the operation of said first generating means being modified each time a pulse of the low frequency is applied thereto whereby the number of times that the operation of the first generating means is modified during a predetermined time interval is indicative of the relative positions of the two plurality of code means.

15. The combination according to claim 14 wherein one of said code means comprises an array of code elements and the other code means comprises a plurality of bit means, each of said bit means having first and second conditions respectively determined by the position of the bit means relative to a code element, each bit means being effective to increase the repetition rate of the low frequency pulse rate when in said first condition and to decrease the repetition rate of the low frequency pulse rate when in said second condition.

16. The combination according to claim 15 wherein said bit means comprises switching circuit means being conductive and nonconductive when said bit means is respectively in its first and second conditions.

17. The combination according to claim 15 wherein said first generating means includes switch means responsive to each pulse of the low frequency pulse rate to modify the operation of the first generating means.

18. The combination according to claim 17 wherein said first generating means is turned off in response to said switch means and said switch means comprises a transistor operative in response to each pulse of the low frequency pulse rate to turn the first generating means off.

19. The combination according to claim 18 wherein said first generating means comprises a first oscillator circuit including a unijunction transistor and said transistor is in circuit with the unijunction transistor to prevent conducting by the unijunction transistor when a pulse of the low frequency pulse rate is applied to said transistor so that the first oscillator circuit is turned off.

20. The combination according to claim 15 wherein said second generating means comprises a second oscillator circuit in circuit with said plurality of bit means.

21. The combination according to claim 20 wherein said second oscillator circuit includes a second unijunction transistor connected to said plurality of bit means and responsive to said first condition of a bit means to produce an output pulse to the first generating means.

22. The combination according to claim 21 wherein said first generating means comprises a first oscillator circuit including a first unijunction transistor and a transistor in circuit with the first unijunction transistor and said second unijunction transistor, said transistor being operative in response to a pulse from second unijunction transistor to prevent conducting of the first unijunction transistor whereby the first oscillator circuit is turned off during the operation of said transistor.